(12) United States Patent
Struckman

(10) Patent No.: US 7,539,273 B2
(45) Date of Patent: May 26, 2009

(54) METHOD FOR SEPARATING INTERFERING SIGNALS AND COMPUTING ARRIVAL ANGLES

(75) Inventor: Keith A. Struckman, Grand Junction, CO (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 752 days.

(21) Appl. No.: 10/529,829

(22) PCT Filed: Jul. 23, 2003

(86) PCT No.: PCT/US03/23158

§ 371 (c)(1),
(2), (4) Date: Mar. 30, 2005

(87) PCT Pub. No.: WO2004/021587

PCT Pub. Date: Mar. 11, 2004

(65) Prior Publication Data

US 2006/0194544 A1    Aug. 31, 2006

Related U.S. Application Data

(60) Provisional application No. 60/406,817, filed on Aug. 29, 2002.

(51) Int. Cl.
*H04L 27/06* (2006.01)
(52) U.S. Cl. .............. 375/341; 375/262; 375/261; 714/786; 714/794; 714/795; 455/67.11; 455/226.1; 342/378; 342/373; 342/451; 342/417
(58) Field of Classification Search ............... 375/341, 375/262, 261; 455/67.11, 226.1; 342/378, 342/373, 451, 417; 714/786, 794, 795
See application file for complete search history.

(56) References Cited

U.S. PATENT DOCUMENTS 4,780,721 A * 10/1988 Dobson ............... 342/178

(Continued)

OTHER PUBLICATIONS

Papadias et al ("New adaptive blind equalization algorithms for constant modulus constellations", Acoustics, Speech, and Signal Processing, 1994. ICASSP-94., 1994 IEEE International Conference on, vol. Iii, Apr. 19-22, 1994 pp. III/321-III/324 vol. 3).*

(Continued)

*Primary Examiner*—Shuwang Liu
*Assistant Examiner*—Helene Tayong
(74) *Attorney, Agent, or Firm*—Joseph E. Funk; Daniel J. Long

(57) ABSTRACT

A method is disclosed for processing all types of received, interfering radio frequency signals corrupted by noise to extract the individual signals without having any a priori knowledge about them. Received signals are converted for eigenspace processing and are subjected to repeated non-linear time domain and fast Fourier transform frequency domain processing that calculates eigenstream beam forming weights U. By performing calculations in eigenspace, the number of independent weights U that must be calculated is generally reduced, minimizing calculating time. Once the weights U have been calculated in eigenspace they are transformed into antenna beam forming weights W that are used to extract the individual signals and to determine the angle of arrival of each of the individual signals. Further time is saved because the weights W do not have to be updated for every time slice of the received signals.

24 Claims, 9 Drawing Sheets

U.S. PATENT DOCUMENTS

| | | | |
|---|---|---|---|
| 5,299,148 A * | 3/1994 | Gardner et al. | 702/196 |
| 5,771,439 A * | 6/1998 | Kennedy et al. | 455/63.1 |
| 5,887,038 A * | 3/1999 | Golden | 375/347 |
| 6,188,352 B1 * | 2/2001 | Choi et al. | 342/378 |
| 6,587,451 B1 * | 7/2003 | Kwon et al. | 370/339 |
| 6,882,681 B2 * | 4/2005 | Sano | 375/148 |
| 7,423,961 B2 * | 9/2008 | Ogawa et al. | 370/210 |
| 2002/0044616 A1 * | 4/2002 | Sim | 375/347 |
| 2002/0054621 A1 * | 5/2002 | Kyeong et al. | 375/147 |

OTHER PUBLICATIONS

Brian G. Agee, "Blind separation and capture of communication signals using amultitarget constant modulus beamformer", Military Communications Conference, 1989. MILCOM '89. Conference Record. Bridging the Gap. Interoperability, Survivability, Security., 1989 IEEE, pp. 0340-0346.*

* cited by examiner $$\begin{bmatrix} Q_{11} & Q_{12} & \bullet & \bullet & Q_{1Na} \\ Q_{21} & Q_{22} & \bullet & \bullet & Q_{2Na} \\ \bullet & \bullet & \bullet & \bullet & \bullet \\ \bullet & \bullet & \bullet & \bullet & \bullet \\ Q_{Na1} & Q_{Na2} & \bullet & \bullet & Q_{NaNa} \end{bmatrix} \begin{bmatrix} \lambda_{11} & 0 & \bullet & \bullet & 0 \\ 0 & \lambda_{22} & \bullet & \bullet & 0 \\ \bullet & \bullet & \bullet & \bullet & \bullet \\ \bullet & \bullet & \bullet & \bullet & \bullet \\ 0 & 0 & \bullet & \bullet & \lambda_{NaNa} \end{bmatrix} \begin{bmatrix} Q_{11}^* & Q_{12}^* & \bullet & \bullet & Q_{Na1}^* \\ Q_{21}^* & Q_{22}^* & \bullet & \bullet & Q_{Na2}^* \\ \bullet & \bullet & \bullet & \bullet & \bullet \\ \bullet & \bullet & \bullet & \bullet & \bullet \\ Q_{1Na}^* & Q_{2Na}^* & \bullet & \bullet & Q_{NaNa}^* \end{bmatrix} = R_{xx}$$

Eigenvector (Q) and Eigenvalue (λ) representation of the $R_{xx}$ covariance matrix

FIGURE 3

$$\sum_{k=1}^{Nsigs} U^{new}(k,ns)^* \frac{1}{\sqrt{\lambda^{new}(k,k)}} Q_{rx}^{new}(1:Na,k)^* \approx \sum_{k=1}^{Nsigs} U^{old}(k,ns)^* \frac{1}{\sqrt{\lambda^{old}(k,k)}} Q_{rx}^{old}(1:Na,k)^*$$

FIGURE 5

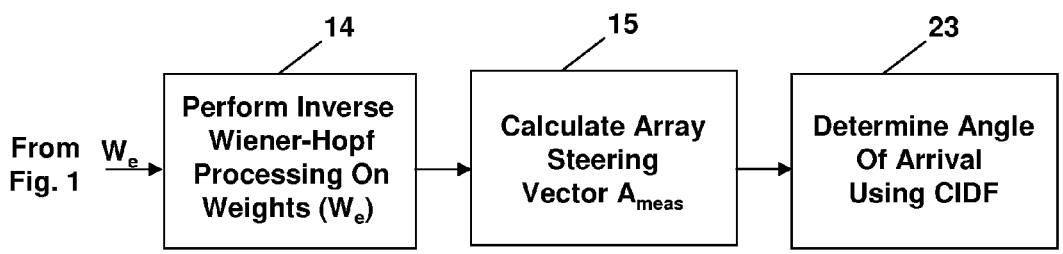

FIGURE 6

Copy / Capture Algorithm Flow

Step 1 (time domain)(Fig. 2, step 31)

CopyT = $U^T$ * SteigsT
Zero out matrix Bt and establish a threshold $T_{ht}$
For each CopyT data stream [ it =1 : Nsp ], on a time bin by time bin basis
    if abs (CopyT(ns, it)) > threshold $T_{ht}$, then B(ns,it) = 1
    YT(ns, it) = B(ns, it) x ([CopyT(ns, it)] / [|CopyT(ns, it)|])
End U = SteigsT * $YT^T$           Updating the U matrix
U = Gram-Schmidt of U     Orthonormalizing the U matrix Step 2 (frequency domain)(Fig. 2, step 33)

CopyF = $U^T$ * SteigsF
Zero out matrix Bf and establish a threshold $T_{hf}$
For each CopyF data stream [ if =1: Nsp ], on a time bin by time bin basis
    if abs (CopyF(ns, if)) > threshold $T_{hf}$, then B(ns, if) =1
    YF(ns, if) = B(ns, if) x ([CopyF(ns, if)] / [|(CopyF(ns, if)|]
End
U = SteigsF * $YF^T$           Updating the U matrix
U = Gram-Schmidt of U     Orthonormalizing the U matrix Cycle through time domain step 1 and frequency domain step 2
until the U weighting matrix converges.

FIGURE 4

METHOD FOR SEPARATING INTERFERING SIGNALS AND COMPUTING ARRIVAL ANGLES

CROSS REFERENCE TO RELATED APPLICATION

This utility patent application claims-rights under 35 U.S.C. 119(e) from U.S. provisional patent application No. 60/406,817 entitled "Copy Capture Algorithm (CCA)", and filed Aug. 29, 2002.

FIELD OF THE INVENTION

The present invention relates to signal processing and, more particularly, to signal processing systems for extracting communication signals from environments containing uncorrelated, co-channel interference, and for signal-selective, radio direction finding.

BACKGROUND OF THE INVENTION

The problem of extracting signals from a noisy environment is well known in the signal processing prior art. The fundamental problem facing any receiver designer is how to improve the reception of a desired signal in the presence of unknown and undesired interfering signals, channel distortion, and thermal background noise.

In principle, this can be accomplished by signal processing. For example, consider a prior art multi-sensor receiver having an array of spatially-separated antennas which is receiving a desired signal from a first direction and interfering signals from other directions. By forming the appropriate linear combination of the antenna outputs, the signals arriving from the desired direction wilt be accentuated while signals from other directions are attenuated. Similarly, with single antenna receivers, notch filters can be used to place notches at the frequencies of narrowband interfering signals and other filter types can be used to equalize linear channel distortion. In both cases, the desired signal reception can be significantly improved by passing the received signal (or signals) through a linear combiner with proper combiner weights.

The basic problem is to set the combiner weights. If all of the parameters of the interfering signals are known, the proper combiner weights can be easily calculated. One approach in the prior art is for a transmitter to send a known signal over a channel. The known signal is sent at the beginning of a transmission, or intermittently in lieu of an information-bearing signal. In this manner, the receiver can be trained at the start of the transmission and the combiner weights updated during the transmission. Other embodiments of this approach transmit a pilot signal along with the information-bearing signal. The pilot signal is used to train and continuously adapt the receiver.

In the prior art, adaptive algorithms have also been used to learn weight settings for a linear combiner by exploiting some known characteristic(s) or quality of a desired signal that distinguishes it from unwanted interfering signals and noise.

There are a number of methods for accomplishing this. There is the Applebaum algorithm that maximizes the signal-to-noise ratio at the output to the adaptive array, and the Widrow-Hoff least-mean-square algorithm that minimizes the mean-square-error between the desired signal and the output of an adaptive array Exact least squares algorithms which optimize deterministic, time-averaged measures of output signal quality have also been developed. However, in directly implementing an adaptive processor that optimizes any such quality measure, the receiver designer must have accurate knowledge of the cross-correlation between the transmitted and received signals. This requires close cooperation between the receiver and the desired signal transmitter, which cooperation may not always be feasible or present.

Alternatively, the receiver may not have the necessary control over the transmitter. This is the case when the receiver that must be adapted is not the intended receiver in the communication channel, such as in reconnaissance applications.

In applications in which a known desired signal cannot be made available by the transmitter to the receiver, the prior art teaches using a blind adaptation technique that exploits other observable properties of the desired signal or the environment in which the signal is transmitted. Prior art techniques for accomplishing this may be divided into three categories.

The first category is a demodulation-directed technique wherein a reference signal is produced by demodulating and re-modulating a processor output signal. This reference signal is then used as a training signal in a conventional adaptive processing algorithm. This technique relies on the demodulator re-modulator loop providing a very clean estimate of the desired signal. However, this requirement is not met until after the demodulator has locked onto the received signal. Until the demodulator does lock on, the reference signal estimate will generally be poor. For this reason, most demodulation directed techniques are employed as tracking algorithms only after a more sophisticated technique has been used to lock onto the desired signal.

The second category is a channel directed technique that exploits known properties of the receiver channel or environment such as the spatial distribution of the received signals. Knowledge of the receiver channel is typically used to generate and apply a reference signal to a conventional adaptation algorithm, or to estimate key statistics which are used to optimize the combiner weights. When applied to antenna arrays, most channel-directed techniques exploit the discrete spatial distribution of the signals received by the array, i.e., the fact that the received signals impinge on the array from discrete directions of arrival.

The third category is referred to as set-theoretic property-mapping and property-restoral techniques, wherein the output of the receiver is forced to possess a set of known properties possessed by the transmitted signal. Here, the receiver processor is adapted to restore known modulation properties of the desired signal to the processor output signal. Modulation properties are defined here as observable properties of the desired signal imparted by the modulation format used at the desired-signal transmitter.

The property restoral technique described in the previous paragraph has been successfully applied to adaptive signal extraction in both filters and antenna arrays and appears to have strong advantages over both the demodulation-directed and channel-directed techniques. However, this techniques still has drawbacks.

The above described techniques are described in greater detail in U.S. Pat. No. 5,299,148, entitled "Self-Coherence Restoring Signal Extraction And Estimation Of Signal Direction of Arrival", issued Mar. 29, 1994 to Gardner et al.

However, there are shortcomings in all prior art techniques described above. Briefly, some feature or properties of a desired, received signal or the environment in which the signal is transmitted must be known and utilized in order to improve the reception of the desired signal in the presence of unknown and undesired interfering signals, noise and distortion. These include knowing the direction from which the desired signal is coming, knowing characteristics of the signal or receiver channel or environment, and using a pilot signal.

A technique for improving the reception of a desired signal in the presence of unknown and undesired interfering signals, channel distortion, and thermal background noise without having the shortcomings in the prior art described in the previous paragraph is taught in a paper by Brian G. Agee. "The Least-Squares CMA: A New Technique for Rapid Correction of Constant Modulus Signals," Brian G. Agee, ICASSP 1986, Tokyo, pp. 953-956, a rapidly converging constant modulus algorithm (CMA) is disclosed that permits extracting FM, PSK, FSK and QAM communication signals from a highly corruptive environment without using a training signal. This paper describes a rapidly converging algorithm based on the method of non-linear least squares CMA for adaptive correction of constant modulus signals. However, the technique taught in this paper only works with constant modulus signals of the type identified above.

Thus, there is a need in the prior art for an improved technique for receiving and separating all types of signals, not just constant modulus signals, in the presence of unknown and undesired interfering signals, channel distortion, and thermal background noise.

SUMMARY OF THE INVENTION

The above described need in the prior art is satisfied by the present invention. A novel, blind copy aided direction finding (DF) algorithm, called a Copy Capture Algorithm (CCA), is taught and claimed. This algorithm does not require received signals to possess any distinguishing features or known characteristics in order to separate co-channel, interfering signals of all types. Therefore it can be considered a universal or general purpose technique. CCA performance on constant modulus, transient, and amplitude modulated signals is within a fraction of a dB of the theoretical maximum signal-to-interference-plus-noise-ratio (SINR).

The copy capture algorithm (CCA) captures and copies co-channel interfering signals by a union of fast Fourier transform (FFT) frequency domain processing and non-linear time domain processing similar to the constant modulus algorithm (CMA) described by Agee and referenced in the Background of the Invention.

Copy signal orthogonalization (signal independence is assumed) of equally weighted eigenstreams is used in conjunction with my novel capture/thresholding process to spatially separate the interfering signals. The CCA time and frequency domain processing uses normalized spectral bin $f(\omega_i)/|f(\omega_i)|$ and $f(t_i)/|f(t_i)|$ multiplications to capture the strongest signal at each step, for each output, as the beam former converges. Time domain and fast Fourier transform bin thresholding is the key to the capture process, and only strong spectral and time domain complex samples are used as product elements for each new iteration of eigenstream processing.

Covariance matrix integration and eigenvector/eigenstream based processing generates time domain eigenstreams defined by steered eigenvectors that are equal in length to their covariance matrix integration periods, which are typically in the order of ten milliseconds.

For most signals, beam forming weights need not be calculated for each time slice, but only need to be updated by Eigenvector generated weight processing on an intermittent basis. This results in large computational time savings.

In the prior art, if there are eight antenna elements and there are four signals being received, a total of thirty two complex weights W must be calculated. With the present invention performing weight calculations in eigenspace only a total of sixteen complex U weights must be calculated to achieve the same result. Each weight has two terms (real and imaginary), calculated for each received signal and each antenna which is used to separate that signal from co-channel interfering signals. The reduction in the number of weights by a factor of two, for the present example, equates to a large savings in the time required to calculate weights, since many weight computational processes increase as the number of unknowns to the third power. Further computational time savings are achieved because the weights need not be updated for every time slice of a received signal.

In addition, a priori knowledge of incoming signals is not required but can reduce the time required to perform calculations. While the copy capture algorithm (CCA) normally captures and copies signals by a union of fast Fourier transform (FFT) frequency domain processing and non-linear time domain processing, both processes need not always be performed. If there is a priori knowledge that only constant modulus signals are being received then non-linear time domain processing may be bypassed. Similarly, when there is a priori knowledge that only non-constant modulus signals are being received then frequency domain processing may be bypassed. Eliminating a processing step of processing improves time performance.

Once final U weights have been calculated and transformed into W weights they may be used to determine the angle of arrival of each of the individual signals comprising a composite received signal. This is done using inverse Wiener-Hopf processing of the weights and a direction finding (DF) algorithm, such as a correlation interferometer direction finding (CIDF) algorithm. CIDF algorithms are widely known in the art and numerous versions and adaptations have been developed.

CIDF algorithms are discussed in a paper by N. Saucier and K. Struckman, *Direction Finding Using Correlation Techniques*, IEEE Antenna Propagation Society International Symposium, pp. 260-263, June 1975.

As a result of use of the novel copy capture algorithm (CCA), all types of interfering received signals are separated, no matter what type of signals are being received, and the direction from which the signals are being received is determined. This can be accomplished with no a priori knowledge of the received signals.

DESCRIPTION OF THE DRAWINGS

The invention will be better understood upon reading the following detailed description in conjunction with the drawing in which:

FIG. 3 shows a sample covariance matrix used with the present invention;

FIG. 4 shows in outline form the mathematics of the time domain and frequency domain processing;

FIG. 5 is an equation used for calculating updated beam forming weights starting with eigenstream beam forming weights to compensate for the port swapping problem;

FIG. 6 is a functional block diagram showing how the angle of arrival may be determined for received signals using calculated beam forming weights;

FIG. 10A shows a time domain signal trace of the signals received on the antenna array shown in FIG. 7;

DETAILED DESCRIPTION

The novel Copy Capture Algorithm (CCA) captures and copies co-channel interfering signals by a union of fast Fourier transform (FFT) frequency domain processing and non-linear time domain processing that is different than the constant modulus algorithm (CMA) described in a paper by Agee identified in the Background of the Invention. Copy signal orthogonalization (signal independence is assumed) of equally weighted eigenstreams is used in conjunction with my novel capture/thresholding process to spatially separate the interfering signals. The CCA time and frequency domain processing uses normalized spectral bin $f(\omega_i)/|f(\omega_i)|$ and $f(t_i)/|f(t_i)|$ multiplications to capture the strongest signal at each step, for each output, as the beam former converges. Time domain and fast Fourier transform bin thresholding is the key to the capture process, and only strong spectral and time domain complex samples are used as product elements for each new iteration of eigenstream processing.

In the following detailed description and the drawings there are numerous terms used that are defined below.

Figure 1:
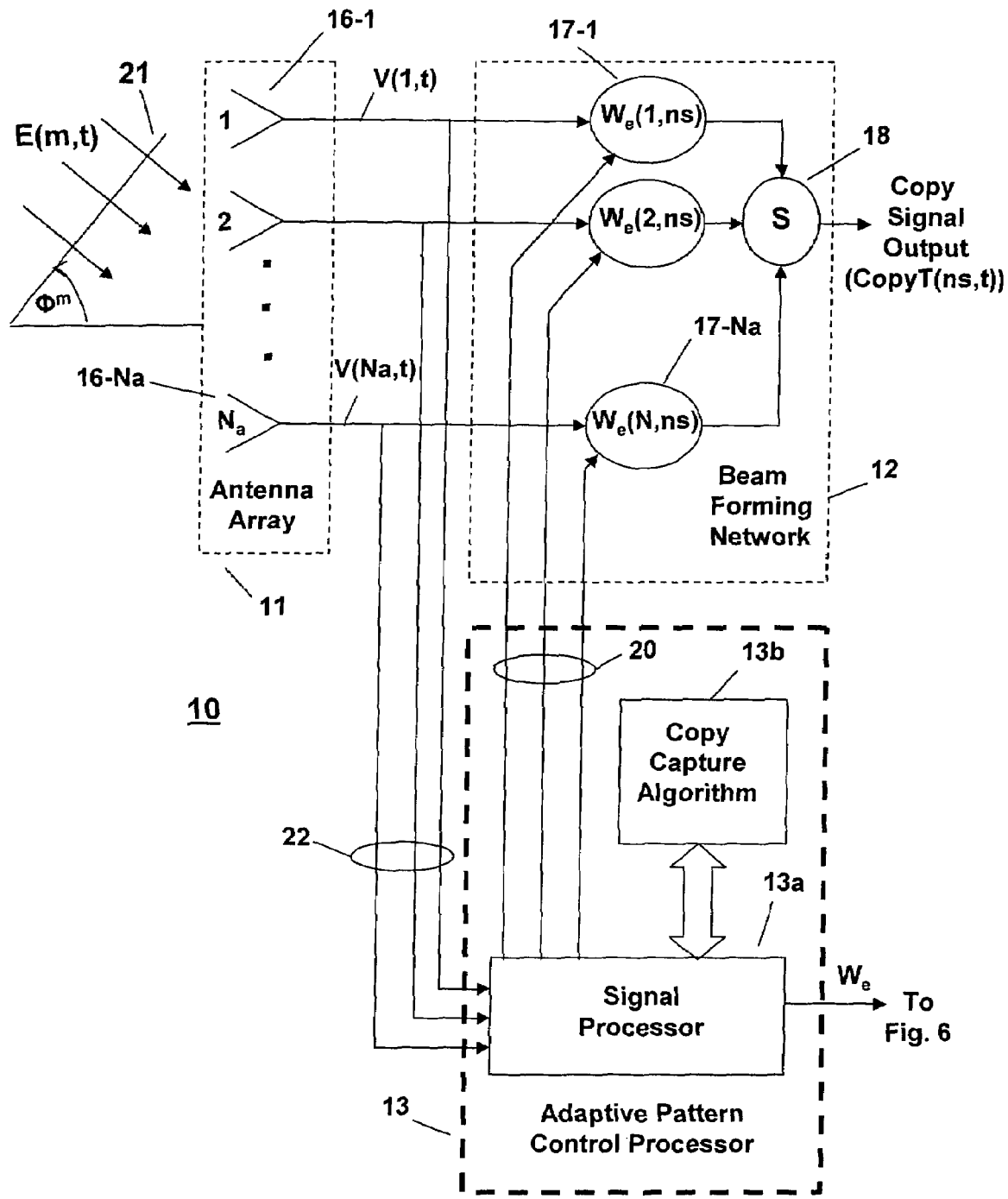
FIG. 1 is a functional block diagram of an adaptive array with processor that utilizes the present invention.

$A_c$=[Na×(number of azimuth calibrations)] array calibration vectors
$A_{meas}$=[Na×Nsigs] CCA computed array steering vectors
$A_r$=Antenna array response vector
B=[Nsigs×Nsp] Threshold dependent vector, values of (1 or 0)
CopyF=[Nsigs×time] frequency domain copied signals internal to adaptive pattern control processor 13 in FIG. 1.
CopyT=[Nsigs×time] time domain copied signals
$D_{rx}$=[Nsigs×Nsigs] diagonal matrix of signal $\lambda_{xx}$ eigenvalues
$D_{xx}$=[Na×Na] diagonal matrix of $\lambda_{xx}$ eigenvalues
E=Electromagnetic radio waves incident on the array of antennas
H=[Nsigs×Na]=$[diag(1/sqrt(D_{rx}))]*[Q_{rx}]^T$ computed function
$[M]^T$=conjugate transpose of matrix [M]
Na=number of antennas in the beam forming/direction finding array
Nsigs=number of signals, including interference, incident on the array
Nsp=number of time samples used to generate the covariance matrix
(O)*=complex conjugate of (O)
$Q_{rx}$=[Na×Nsigs] reduction, (signals and interference) version of $Q_{xx}$
$Q_{xx}$=eigenvectors
$R_{ii}$=[Na×Na] interference covariance matrix, used only for maximum SINR calculations
$R_{nn}$=[Na×Na] thermal noise covariance matrix, used only for maximum SINR calculations
$R_{rx}$=$[Q_{rx},x]*[D_{rx}]*[Q_{rx}]^T$ reduced eigenvector decomposition of $R_{rx}$
$R_{ss}$=[Na×Na] desired signal covariance matrix, used only for maximum SINR calculations
$R_{xx}$=[Na×Na] measured Hermitian covariance matrix
$|R(\phi^c)|^2$=correlation squared direction finding function
SINR=signal-to-interference plus noise ratio
SNR=signal-to-noise ratio
SteigF=FFT(SteigT) frequency domain eigenvector spectrum
SteigT=[H]*[Vn,it)]=[Nsigs×Nsp] time domain normalized eigenvector data streams
$T_{hf}$=frequency domain threshold
$T_{ht}$=time domain threshold
U=[Nsigs×Nsigs] eigenstream beam forming weights in weighting matrix
V=[Na×Nsp] complex (I & Q) antenna voltages at an antenna (n)
$W_e$=[Na×Nsigs] antenna beam forming weights in weighting matrix
$\lambda_{xx}$=eigenvalues of the measured covariance matrix In the following description Eigenspace is defined as follows. If $R_{xx}$ is an Na×NA square matrix and $\lambda$ is an eigenvalue of $R_{xx}$, then the union of the zero vector 0 and the set of all eigenvectors corresponding to eigenvalues $\lambda$ is known as the eigenspace of $\lambda$. The terms eigenvalue and eigenvector are well known in the art.

In the following description a SteigT is defined as a time domain eigenstream defined by a steered eigenvector, and the number of SteigT data streams is equal to the number of independent signals incident on the array. Stated another way, a SteigT is an orthogonalized signal formed by multiplying antenna voltages by a signal eigenvector. The voltage from each antenna of an array of antennas is a composite voltage and is created by all signals incident on the antenna including noise. The SteigsT are defined mathematically as:

$$SteigT(k, t) = \frac{1}{\sqrt{\lambda_{xx}(k, k)}} \sum_{n=1}^{Na} Q_{rx}(n, k) * V(n, t)$$

where the terms are defined above.

In the following description reference is made to eigenspace decompositions. Eigenspace decompositions are well known in the art and are used in solving many signal processing problems, such as source location estimation, high-resolution frequency estimation, and beam forming. In each case, either the eigenvalue decomposition of a covariance matrix or the singular value decomposition of a data matrix is performed. For adaptive applications in a non-stationary environment, the eigenvalue decomposition is updated with the acquisition of new data and the deletion of old data. This situation arises where a transmitter or receiver are moving with relation to each other. For computational efficiency or for real-time applications, an algorithm is used to update the eigenvalue decomposition code without solving the eigenvalue decomposition problem from scratch again, i.e., an algorithm that makes use of the eigenvalue decomposition of the original covariance matrix. In numerical linear algebra, this problem is called the modified eigenvalue problem.

FIG. 1 is a functional block diagram of an adaptive array 10 showing primary system elements that it must possess if it is to successfully achieve two objectives of enhancing desired signal reception and rejecting undesired interference signals. Adaptive array 10 system consists of an antenna array 11 comprising a plurality of antenna elements 16-1 through 16-Na, a beam forming network 12 comprising a plurality of weighting circuits 17-1 through 17-Na equal to the number of antenna elements 16-1 through 16-Na, a summing circuit 18, and an adaptive pattern control processor 13 that calculates and adjusts the variable beam forming weights for the beam forming network 12. Processor 13 is shown subdivided into a signal processor unit 13a and an adaptive control algorithm 13b. The manner in which these elements 11-18 are actually implemented depends on the propagation medium in which the antenna array 11 is to operate and the frequency spectrum of interest.

The antenna array 11 consists of Na antenna elements 16-1 through 16-na and is designed to receive and transmit signals in a propagation medium of interest. The antenna elements 16 are arranged to give adequate coverage (pattern gain) over a certain desired spatial region. The selection of antenna elements 16 and their physical arrangement place fundamental limitations on the ultimate capability of the adaptive array system 10.

When using the present invention the antenna array 11 must contain one more antenna element 16 than the number of incident signals making up a received co-channel signal. Thus, a sufficient number of antenna elements 16 should be provided to meet the contemplated maximum number of received interfering signals.

In FIG. 1, an incident electromagnetic signal E(m,t) 21 impinges on antenna array 11 and arrives at each antenna element 16 at different times as determined by the angle of arrival $\phi^m$ of signal 21 with respect to array 11 and the spacing of the antenna elements 16. The actual signal 21 may often comprise a number of co-channel interfering signals that must be separated using the teaching of the present invention. The voltage term V(n,t) denotes the complex waveform envelope that is output from an antenna 16 and is the only quantity that conveys information. Rather than adopt complex envelope notation, it is assumed in this specification that all signals are represented by their complex envelopes so the common carrier reference never explicitly appears. Therefore each of the N channel received signals V(n,t) represents the complex envelope of the output of one element of antenna array 11 and represents one or more signals, one of which may be a signal of interest and a noise component $\eta(n,t)$, and is represented by the equation:

$$V(n,t)=E(m,t)A_r(n,\phi^m)+\ldots E(m,t)A_r(n,\phi^m)+\eta(n,t)$$

Where $A_r(n, \phi^m)$ is defined above and in more detail here as the complex response of antenna (n) in azimuth direction $\phi^m$.

The voltages V(1,t) through V(Na,t) output respectively from antenna elements 16-1 through 16-Na are input to beam forming weighting circuits 17-1 through 17-Na, and are also carried over leads 22 to signal processor 13a in adaptive pattern control processor 13. Processor 13a operates under control of the copy capture algorithm 13b to process signal 21 incident on antenna array 11 and calculate complex beam forming weights $W_e$ for each signal and for each of the N antenna elements 16 making up antenna array 11.

The signal V(1,t) through V(Na,t) output from each of the Na antenna elements 16-1 through 16-N is input to a respective one of weighting circuits 17-1 through 17-Na in beam forming network 12 where it is multiplied by an associated one of the aforementioned complex beam forming weights $W_e$(1,ns)-$W_e$(Na,ns) calculated for these same signals. The weighted signals output from each of the weighting circuits 17 are summed in summing circuit 18 to form signal Copy-SigT(ns,t) which is the separated copy stream for each of the signals making up signal 21 that is impinging on antenna array 11. Beam forming network 12 is implemented in software, there is one network 12 for each signal being copied and captured, and there are a set of weights for each signal.

The problem facing the adaptive pattern control processor 13 is to select the various complex weights $W_e$ for beam forming network 12 so that a certain performance criterion is optimized. The performance criterion that governs the operation of adaptive pattern control processor 13a must be chosen to reflect steady-state performance characteristics that are of concern. The most popular performance measures that have been typically employed in the prior art include the mean square error, signal to noise ratio, output noise power, maximum array gain, minimum signal distortion, and variations of these criteria that introduce various constraints into the performance index.

In the Agee paper identified in the Background of the Invention a blind copy technique is taught for improving reception of signals in the presence of unknown and undesired interfering signals, channel distortion, and thermal background noise. The technique described is based on an algorithm identified as a least squares constant modulus algorithm (LSCMA). However, the technique may only be used with constant modulus signals and no other type of signal. Thus, in environments where constant modulus, transient, and non-constant modulus signals are jointly present and interfere with each other the LSCMA is of no use.

With the incorporation of the present invention the novel copy capture algorithm (CCA) as the adaptive control algorithm 13b in processor 13 results in the ability to copy capture individual, interfering signals making up received signal 21 without resorting to modulation dependent beam forming techniques.

The calculation of the complex beam forming weights $W_e$ is done using the teaching of the invention by performing all calculations in eigenspace to obtain eigenweights U that are used to beam form in this transformed space. Eigenspace beam forming simplifies and speeds up the weight processing calculations. Complex eigenspace beam forming weights U are then converted into complex antenna beam forming weights We which are applied via leads 20 to the weighting circuits 17 in a beam forming network 12 to capture a specific received signal associated with the weights.

Figure 2:
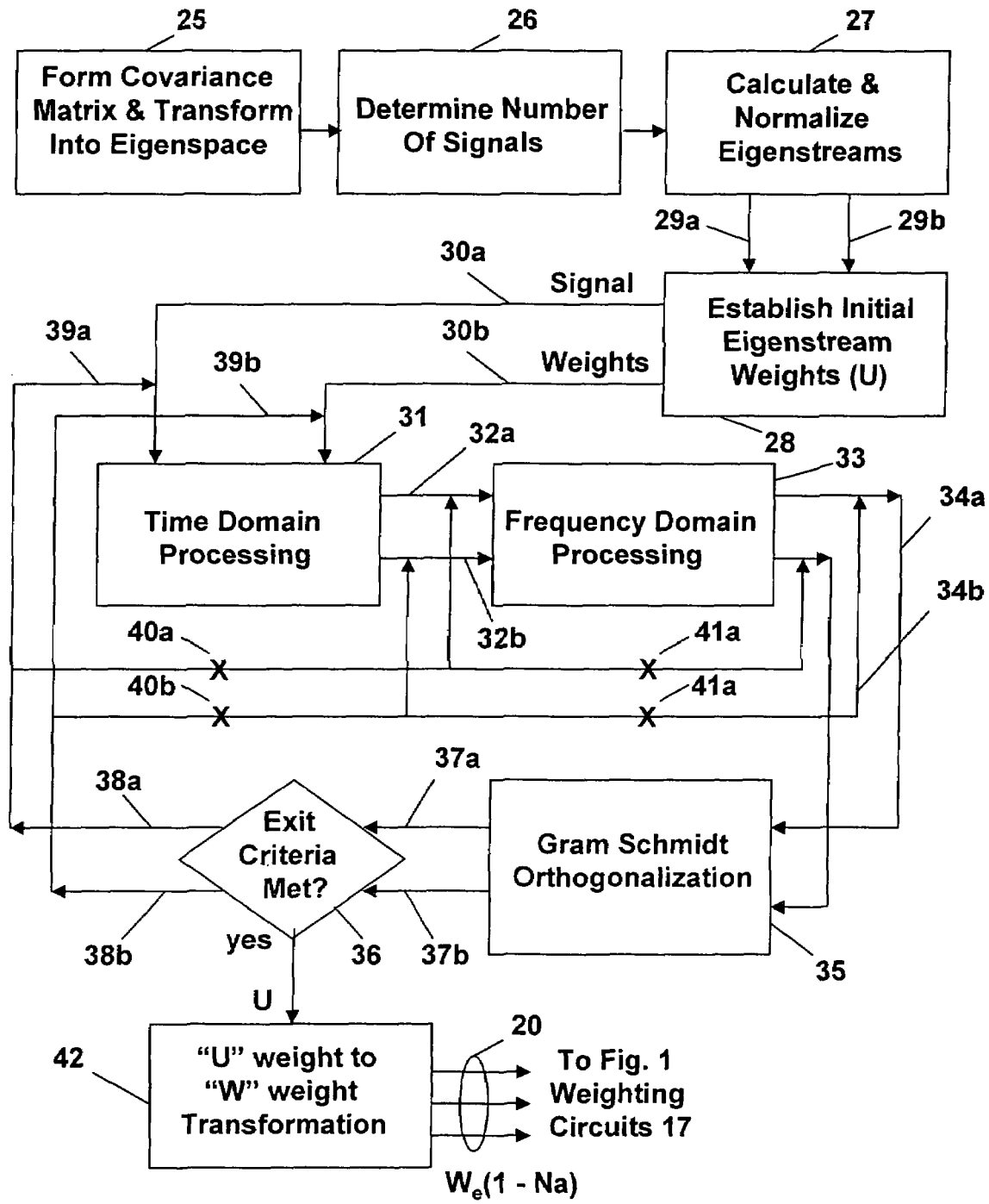
FIG. 2 shows a functional block diagram of the steps performed reflecting the methodology of the copy capture algorithm when processing received, conflicting signals.

In FIG. 2 is a functional block diagram showing the steps performed reflecting the methodology of the novel copy capture algorithm (CCA) processing of received, interfering signals in accordance with the teaching of the invention.

At step 25 a covariance matrix of $R_{xx}$ is formed from samples of the incoming voltage data streams V(n,t) from each of antenna elements 16 of antenna array 11 in FIG. 1. Initially, the incoming voltage data streams V(n,t) from each of antenna elements 16 are summed as cross products in a matrix where each element in the matrix represents the summation of cross products for a pair of antenna voltages. The number of rows and columns are each equal to the number of antennas. The length of the covariance matrix integration periods, is typically in the order of ten milliseconds. The covariance matrix is given by the equation:

$$R_{xx}(i,j) = \sum_{it=1}^{it=Nst} V(i,it) * V(j,it)^*$$

As is known in the art, the number of received signals is determined by the number of significant eigenvalues of the covariance matrix which is an [Na×Na] square matrix. The matrix is then transformed into eigenspace by conventional Hermitian matrix decomposition techniques that produce an equivalent form shown in FIG. 3, and the matrix is described in greater detail further in this specification. Covariance matrices are well known in the signal processing art. The number of eigenstreams equals the number of signals received by antenna array 11 in FIG. 1 and this is determined at step 26. There is a requirement when utilizing the present invention that the number of antenna elements 16 in array 11 is one more than the number of incident signals being received by array 11 or the signals cannot be copy captured and separated.

To do this, a threshold number equal to 10 times the smallest eigenvalue is initially assumed. The smallest eigenvalue belongs to the noise space and is the noise power seen in the direction of the associated eigenvector. The initial threshold is set by definition to 10 dB above the noise power of the smallest eigenvalue.

Copy extraction is a single sample phenomena, the quality of the copy cannot be any better than the single sample Signal to Noise Ratio (SNR), including maximum array gain, given that it is the only signal impinging on the array. When multiple signals impinge on the array, the array gain may be reduced due to the beam forming constraint of rejecting the undesired signals. The copy will usually experience a reduced SNR performance in the face of interfering signals. Thus, the initial threshold of 10 dB above the smallest eigenvalue (noise) provides a high probability of detection given the fact that there is little value in isolating a copy that has a poorer single sample SNR. Given the initial threshold, the next smallest eigenvalue is compared against the threshold. If the eigenvalue is less than the threshold, the new eigenvalue is deemed to belong to the noise space and the threshold is re-adjusted to account for the noise power of the new eigenvalue deemed to be in the noise space. The process is continued, testing the next smallest eigenvalue to the new threshold and re-adjusting the threshold if that eigenvalue is less than the threshold. The process ends when an eigenvalue exceeds the threshold or there is no signal impinging on the array. Providing a higher initial threshold will certainly decrease the false alarm rate albeit at the expense of signal detection.

The eigen decomposition code is not needed when the copy capture algorithm (CCA) is used in conjunction with a subspace tracker that provides not only the number of signals but also provides the eigenvalues and associated eigenvectors that the CCA needs to derive the beam form weights and angles of arrival of the individual incident signals.

The number of received signals is determined at step 26 as previously described.

At step 27 the eigenstreams are normalized. The normalization procedure makes the integrated SteigT(k,it) eigenstream powers equal to unity for the duration of the development the eigenstream beam forming weights U.

At step 28 the initial beam forming weight matrix U is set equal to the identity matrix. At the beginning of the process of optimizing these beam forming weights U, the weights are inserted into time domain processing 31 and/or frequency domain processing 33. The signal and the preliminary eigenstream weights U from step 28 are output respectfully on leads 30a and 30b and input into non-linear time domain processing in step 31 or bypassed by switches 40a and 40b and inserted into frequency domain processing in step 33.

As the copy streams are serially processed and adapted in both the time and frequency domains, the phase information yielded by the copy streams leads to a capture process similar to the classical frequency modulation capture process which applies whenever the signal carrier level is greater than noise level. For a given amount of noise at a receiver, there is a sharp threshold above which the noise is suppressed. This threshold has been defined as the improvement threshold.

Each copy stream is given by the equation:

$$CopyT(ns, t) = \sum_{k=1}^{Nsigs} U^*(k, ns) SigT(k, t)$$

After adaptation and convergence there will be an independent copy stream for each of the signals making up the composite signal incident upon antenna array 16.

There are times when either time domain signal processing or frequency domain signal processing are not needed. When this determination is made the non-selected processing step is bypassed. When time domain signal processing is not to be performed switches 40a and 40b are operated and the eigenstreams and eigenweights U bypass step 31 and receive only time frequency domain signal processing at step 33. In actuality there are no switches and the processing represented by block 31 is merely eliminated. Conversely, when frequency domain signal processing is not to be performed switches 41a and 41b are operated and the eigenstreams and eigenweights output from step 31 bypass step 33 and therefore receive only time domain signal processing. Again, there are no physical switches and processing in step 33 is merely eliminated. How this decision is made is described further in this specification. The U convergence sequence is generally initiated with time domain processing for unknown signal conditions since if most of the signals are transient, time domain processing quickly captures them.

After frequency domain processing at step 33, or if this step is bypassed, the process continues to step 35 where the signals undergo a Gram-Schmidt orthogonalization to insure orthogonalization of the copy streams that are internal to adaptive pattern control processor 13 in FIG. 1.

More specifically, independent copy streams, either of a desired signal or of received interfering signals do not correlate. Therefore:

$$\sum_{it=1}^{Nsp} CopySigT(k, it) * CopySigT(1, it)^* \approx 0 \text{ if } k \neq 1$$

This condition dictates that independent copy streams, generated by U weighted eigenstreams, must be developed by weights that are orthonormal. The CCA adaptation process insures that this requirement is met by inserting U weights into a Gram-Schmidt orthogonal and normalization subroutine.

After the orthogonalization the signal processing proceeds to step 36 where a determination is made if an exit criteria has been met. Going into time domain processing step 31 the first time the eigenweights U are termed "$U^{initial}$". After the first iteration of time domain and frequency domain processing, and any interation of frequency and time domain processing thereafter, the eigenweights are termed "$U^{updated}$". At step 36, after the first iteration of time and frequency domain processing the eigenweights "$U^{initial}$" are compared to the eigenweights "$U^{updated}$" output from step 35 for the difference or rate of change of U.

If a pre-determined threshold difference has been exceeded the process exits step 36 at "no" and the eigenstreams and eigenweights U (now termed "$U^{old}$") are cycled back to the input of step 31 to be re-processed through the time and frequency domain processing steps 31 and 33. After each iteration of frequency and time domain processing at steps 31 and 33 the signals undergo orthogonalization and normalization at step 35.

More specifically, after each iteration of processing through time and frequency domain processing steps 31 and 33, each element of the matrix $U^{updated}$ is multiplied by its complex conjugate, and each element of $U^{initial}$ for the first iteration of processing and $U^{old}$ for subsequent iterations of processing is multiplied by its complex conjugate. The sum of the absolute value of the differences of the two real valued matrices are compared to a threshold value of 0.00005. If the sum is less than the threshold value, the rate of change of the $U^{updated}$ matrix is declared to have achieved its minimum, the process is ended, and the decision at step 36 is "yes". If the sum is greater than the threshold value, the rate of change of the $U^{updated}$ matrix is declared to have not achieved its minimum, the decision at step 36 is "no", and the time and frequency domain processing steps are re-performed. When the decision is "no" the signal segment and eigenweights, "$U^{old}$", are reapplied to the input of time domain processing step 31 for another serial iteration of time and frequency domain processing.

The number of iterations of time and frequency domain processing is a function of signal density and usually varies between one and five iterations of processing, but the number of processing iterations may be higher as required to separate the interfering signals. If, however, time and frequency domain processing continues for ten iterations, the processing is terminated and the output at step 36 is "yes".

The adaptive U weight convergence sequence described in detail above is shown in a more concise pair of processing loops shown in FIG. 4. Threshold factors $T_{ht}$ and $T_{hf}$ are key for optimum adaptive processing and they determine the signal components that contribute in the capture process. These functions are shown in FIG. 4 in the lines:

if abs(CopyT(ns, it))>threshold $T_{ht}$, then B(ns,it)=1

YT(ns, it)=B(ns, it)×([CopyT(ns, it)]/[|CopyT(ns, it)|])

and if abs(CopyF(ns, if))>threshold $T_{hf}$, then B(ns, if)=1

YF(ns, if)=B(k, if)×([CopyF(ns, if)]/[|(CopyF(ns, if)|])

In some applications of the present invention an adaptive array 10 is mounted on a moving platform that is receiving signals under changing azimuth, elevation, pitch and roll conditions. Therefore, beam forming weights must adapt to these changing physical conditions. If each new adaptation starts with an identity matrix U, then a particular copy index may represent a different signal, a problem that is identified in the prior art as port swapping. These can be re-sorted by a direction finding procedure, but there is an easier solution if the adaptation starting U weights are initialized with starting weights that fit the old weights in a least-mean-square (LMS) sense, which in most cases reduces the port swapping problem.

The LMS concept is to compute a new set of antenna voltage weights $W_e$ that approximate the old set ($W_e^{new} \approx W_e^{old}$), which new weight sets are calculated using U weights that must satisfy the equation in FIG. 5.

This LMS process establishes a set of adaptation $U_{starting}$ weights given in terms of the old U, old H and new H functions that is described in a compact matrix form given by:

$$U_{starting}^{new} = [[H^{new}]*[H^{new}]^T]^{-1} * [[H^{old}]*[H^{old}]^T] * U^{old}$$

New Steig U weights developed via the equation immediately above will generate a following copy stream that is a continuation of the old copy stream if two conditions prevail: (1) the number of new signal eigenvalues is equal to or greater than the number of old eigenvalues, and (2) the signal-to-noise ration (SNR) is reasonably high. The new Steig U weight values computed by the equation immediately above are not to be simply used for new copy generation; but should be used as initial values that are inserted into the copy capture algorithm (CCA). If a single copy stream is of interest and is to be followed, then only the U vector associated with the signal of interest needs to be input into the CCA. It needs to be inserted as the first vector being processed, where it is not orthogonalized, but will simply be updated by the CCA capture process. The Steig U weights for signals, including noise, that are not of interest are orthogonalized to the U weights associated with the signal of interest.

FIG. 4 shows in an outline form the mathematics of the time domain and frequency domain processing steps 31 and 33. At the top of the Detailed Description are given definitions for the mathematics expressions shown in this Figure. In Step 1 are outlined the mathematics involved in the time domain signal processing, and in Step 2 are outlined the mathematics involved in the frequency domain signal processing.

In step 1 there is a time domain threshold $T_{ht}$ to be estimated, and in step 2 there is a frequency domain threshold $T_{hf}$ to be estimated. If only a constant modulus signal is being received, or is the only signal to be captured, $T_{ht}$ is set equal to zero and time domain processing step 31 in FIG. 2 is bypassed at 40a&b. Similarly, if only a non-constant modulus signal, that never has zero amplitude, is being received, or is the only signal to be captured, $T_{hf}$ is set equal to zero and frequency domain processing step 33 in FIG. 2 is bypassed at 41a&b.

However, when all received signals are non-constant modulus signals that are closely spaced as to have spectral components, both time domain and frequency domain processing must be utilized. For unknown signal modulation conditions, the default values of: $T_{ht}$=0.9×mean signal power and $T_{hf}$=0.9×maximum spectral bin amplitude are recommended.

Covariance matrix integration and eigenvector/eigenstream U weight based processing generates SteigsT copy streams that are equal in length to the covariance integration periods which are typically in the ten millisecond range. Generating continuous, separated copy data streams for each interfering signal by this method means that complex covariance matrices must be computed for every time domain slice, an extensive computational process.

However, for most applications, weights designated as $W_e$ in FIG. 1 can be used for extended periods and will only need to be updated by eigenvector generated weight processing on an intermittent basis. This simplifies the process of calculating real beam forming weights $W_e$. Therefore, when the U weight adaptation is completed, the normalized eigenstream SteigT weights U are used to determine real antenna voltage copy beam forming weights $W_e$ for each individual signal making up the received signal copy signal at summing block 18 in FIG. 1. For this purpose the following equation is utilized:

$$W_e(1:Na, ns) = \sum_{k=1}^{Nsigs} U^*(k, ns) \frac{1}{\sqrt{\lambda(k, k)}} Q_{rx}(1:Na, k)^*$$

Where the terms are defined above and in more detail below
$W_e(1:Na,ns)$=the copy weight for signal ns.
$U^*(k,ns)$=weight for eigenstream (k,t) and signal ns
$\lambda(k,k)$=eigenvalue for an eigenstream (k)
$Q_{rx}(1:NA,k)$=eigenvector associated with an eigenstream (k)

This is expressed in a simpler matrix multiplication form as:

$$W_e = [H]^t[U]$$

Each of the output signals V(1,t) through V(Na,t) from each of the N antenna elements 16 in antenna array 11 is input to an associated weighting circuit 17 in beam forming network 12 where it is multiplied by an associated one of the aforementioned complex weights $W_e$ calculated for these same signals. The weighted signals output from each of the weighting circuits 17 are all summed in summing circuit 18 to form signal CopySigT(j,it) which is the separated copy stream for each of the interfering signals making up signal 21 that is impinging on antenna array 11. Beam forming network 12 is implemented in software and there is one network 12 for each signal being copied and captured. Thus, there is a different set of beam forming weights $W_e$ for each network 12.

Mathematically the weighting and summing process is expressed as:

$$CopySigT(j, t) = \sum_{n=1}^{Na} W_e(n, j) * V(n, t)$$

The range of ns is the same as the range of Nsigs,1 to the number of received signals. There are two sets of time domain copy signals for each incident signal, the one established by summation circuit 18 of FIG. 1 that is continuous and the CopySigT (ns,it) copy that is used during U weight adaptation and has a limited time span that is set by the integration period or, in DSP terms, the summation time used to generate the measured covariance matrix $[R_{xx}]$.

The signal to interference plus noise ratio (SINR) is given by:

$$SINR = \frac{[W_e][R_{ss}][W_e^*]}{[W_e][R_{ii} + R_{nn}][W_e^*]}$$

This SINR ratio can only be computed when the covariance matrix terms are known, a condition which seldom occurs during actual operation. During numerical evaluations, these terms can be computed and used as accuracy measures. The optimum SINR is then given by inserting optimized weights into the equation above that is the eigenvector associated with the maximum eigenvalue computed from a matrix [M] given by:

$$[M] = [R_{nn} + R_{ii}]^{-1} * [R_{ss}]$$

This optimum solution is used to demonstrate the accuracy of the CCA copy technique, since ideally CCA will generate SINR values that are nearly equal to the optimum.

In FIG. 6 is shown the steps of calculating angle of arrival of each signal of interest. There is an input from signal processor 13a in FIG. 1. That input carries the final beam forming weights $W_e$ for each received signal of interest calculated by processor 13a after it has finished calculating weights U in eigenspace and then converting them to the final weights $W_e$. The weights $W_e$ for each of the received signals of interest can used in the steps shown in this Figure to determine the angle of arrival (AOA)/azimuth of each of the received, incident signals on antenna array 11. As the weights $W_e$ are updated by signal processor 13a they are forwarded to FIG. 6 for updated AOA processing.

The part of composite signal E(m,t) incident on antenna array 11 in FIG. 1 that corresponds to which CopySig (ns,t) signal depends on the starting U weights and many initially unknown factors such as wave arrival, signal strengths, polarization etc. Therefore adaptation direction finding can be used to associate an AOA wave arrival angle with a particular copied signal. The final beam forming weights $W_e$ for each received signal of interest are calculated by processor 13b after it has finished calculating Steig weights U in eigenspace and then converting them to the final weights $W_e$. The weights $W_e$ for each of the received signals of interest are used in the steps shown on FIG. 6 to determine the angle of arrival (AOA) of each of the received, incident signals on antenna array 11. As the weights $W_e$ are updated by signal processor 13a they are forwarded to FIG. 6 for updated AOA processing.

At block 14, utilizing the well known Wiener-Hopf equation, inverse processing is first performed on each of the copy weights $W_e$. In block 15 the results of the Wiener-Hopf equation, inverse processing are used to calculate the array steering vector "$A_{meas}$". In block 23 the array steering vector is used to determine the angle of arrival of each of the individual signals comprising the composite received signal E(m,t). The Wiener-Hopf equation is described in further detail below.

More specifically, the calculated copy weights $W_e(1,ns)$-$W_e(Na,ns)$ are used to compute incident wave arrival vectors "$A_{meas}$" that are then inserted into a direction finding (DF) algorithm, such as the known correlation interferometer direction finding (CIDF) algorithm. Such CIDF algorithms are widely known in the art and numerous versions and adaptations have been developed. The relationship between the optimum weights $W_e$(optimum), a covariance matrix $R_{xx}$ and the wave arrival vectors $A_{meas}$, assuming independent incident signals, is given by the Wiener-Hopf equation:

$$[A_{meas}] = [R_{xx}][W_e(optimum)]$$

In the copy aided direction finding (DF) format, optimum beam forming weights $W_e$ are computed first, then the wave arrival vectors "$A_{meas}$" are calculated. This minimum mean square error solution for the copy weights is simply given by the inverse of the measured covariance matrix multiplied by the conjugate of the array steering vector $[A_{meas}]$.

The CIDF algorithm digitally steers an antenna array by cross-correlating a set of measured array voltage vectors with sets of array testing voltage vectors. When a DF bearing is requested, a numerical correlation comparison is computed as measured vectors to testing vectors (calibration or array manifold), as the testing vectors are scanned through angular sectors of interest. The resultant CIDF correlation equation is:

$$|R(\phi^c)|^2 = \frac{\left|\sum_1^{Na} A_{meas} A_c^*(\phi^c)\right|^2}{\left(\sum_1^{Na} |A_{meas}|^2\right)\left(\sum_1^{Na} |A_c(\phi^c)|^2\right)}$$

Where the terms are defined above or with more detail below:
$|R(\phi^c)|^2$=the correlation squared function computed at testing angles ($\phi^c$)
$A_{meas}$=the antenna steering vector computed for a signal that is incident on the DF array such as those computed by the CCA process.
$A_c(\phi^c)$=the array vectors retrieved from a calibration manifold.

Figure 7:
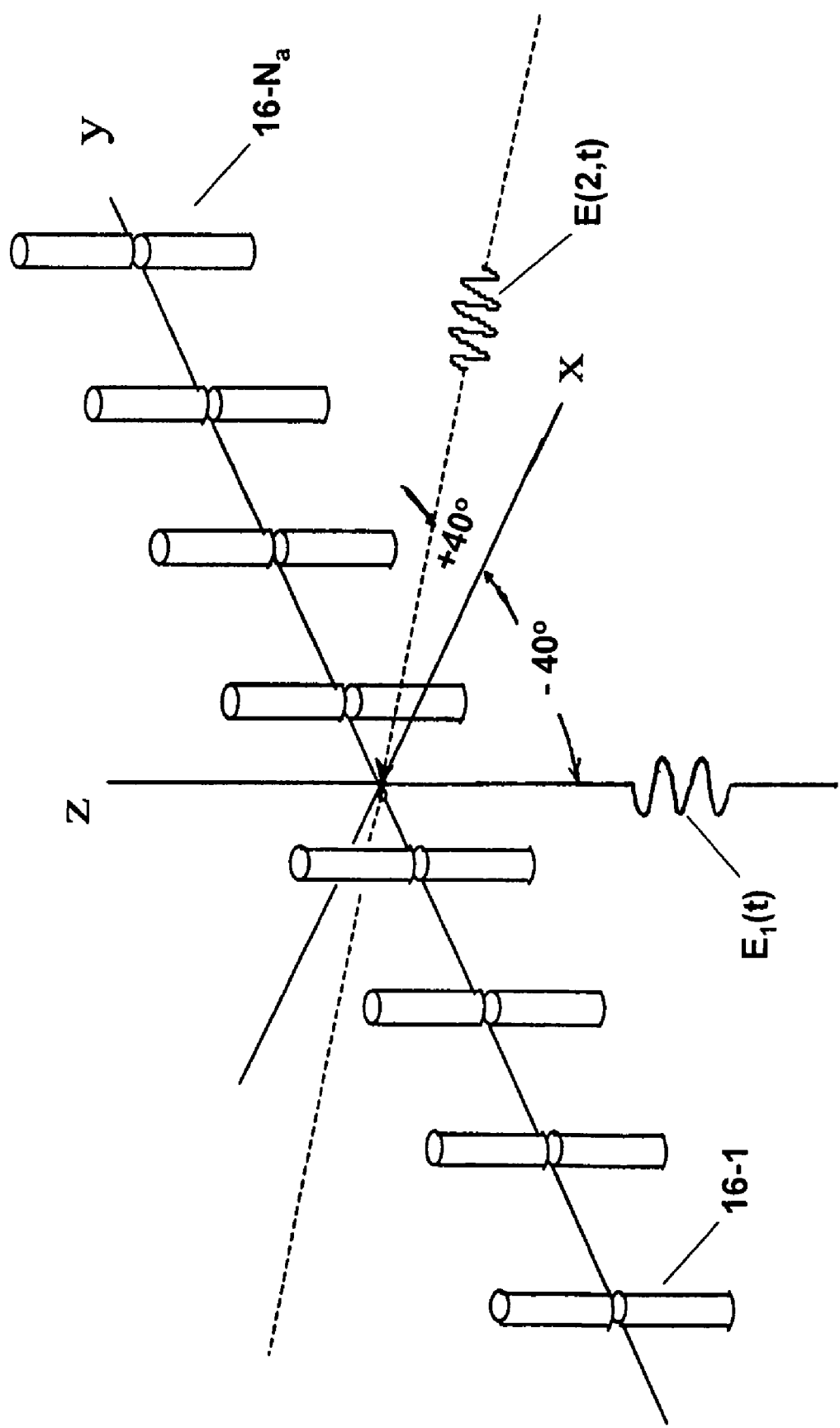
FIG. 7 shows an eight dipole antenna array with two interfering signals incident thereon.

FIG. 7 shows a linear, eight element dipole antenna (16-1 through 16-Na) that is used for a mathematical demonstration of the invention. Dipole to dipole spacing is set at 0.375λ. Two signals E(1,t) and E(2,t) arrive along the Z=zero plane. Signal E(1,t) is a constant amplitude, transient signal that arrives at an angle φ=−40 degrees. Signal E(2,t) is a non-constant modulus, amplitude modulated signal arriving at an angle φ=+40 degrees.

Figure 8A:
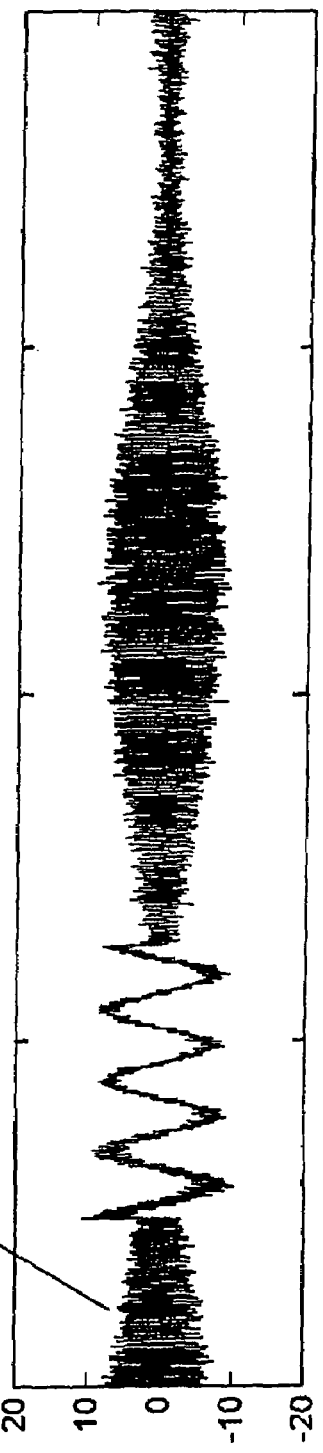
FIGS. 8A and 10a show the waveform of amplitude modulated and constant modulus, transient signals that are interfering with each other.
Figure 8B:
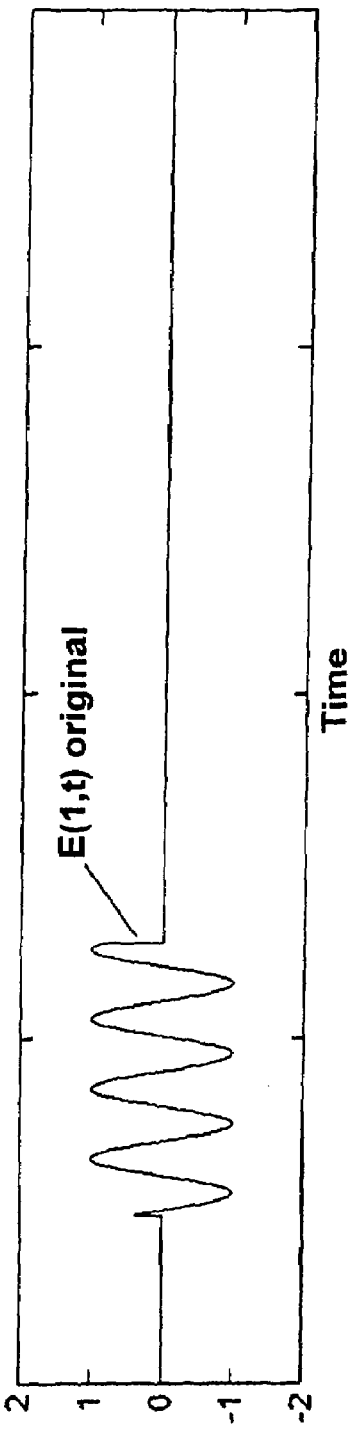
FIG. 8B shows the original constant modulus, transient signal of FIGS. 8A and 10A as it is transmitted.
Figure 8C:
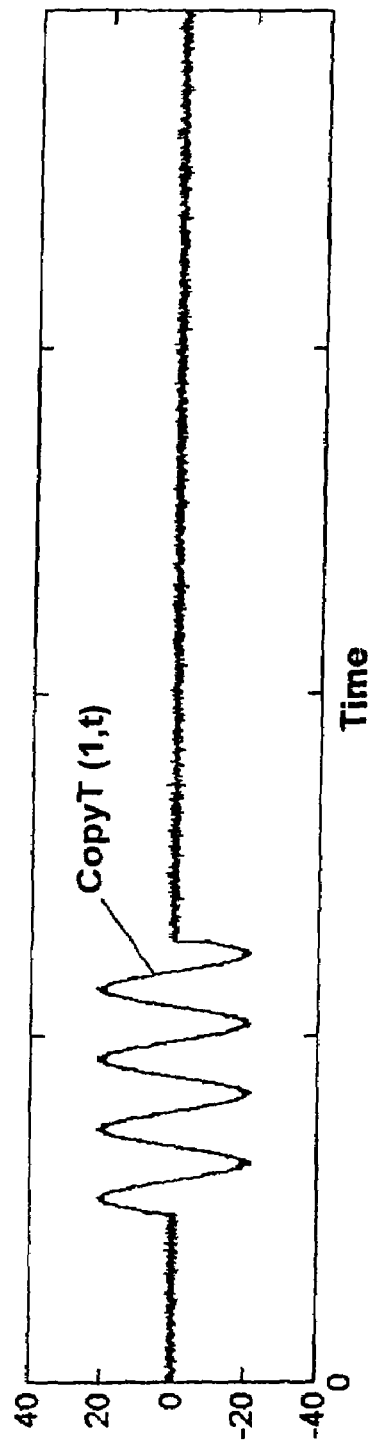
FIG. 8C shows the constant modulus, transient signal after it has been captured and separated from the interfering signals shown in FIGS. 8A and 10A using the teaching of the present invention.
Figure 9:
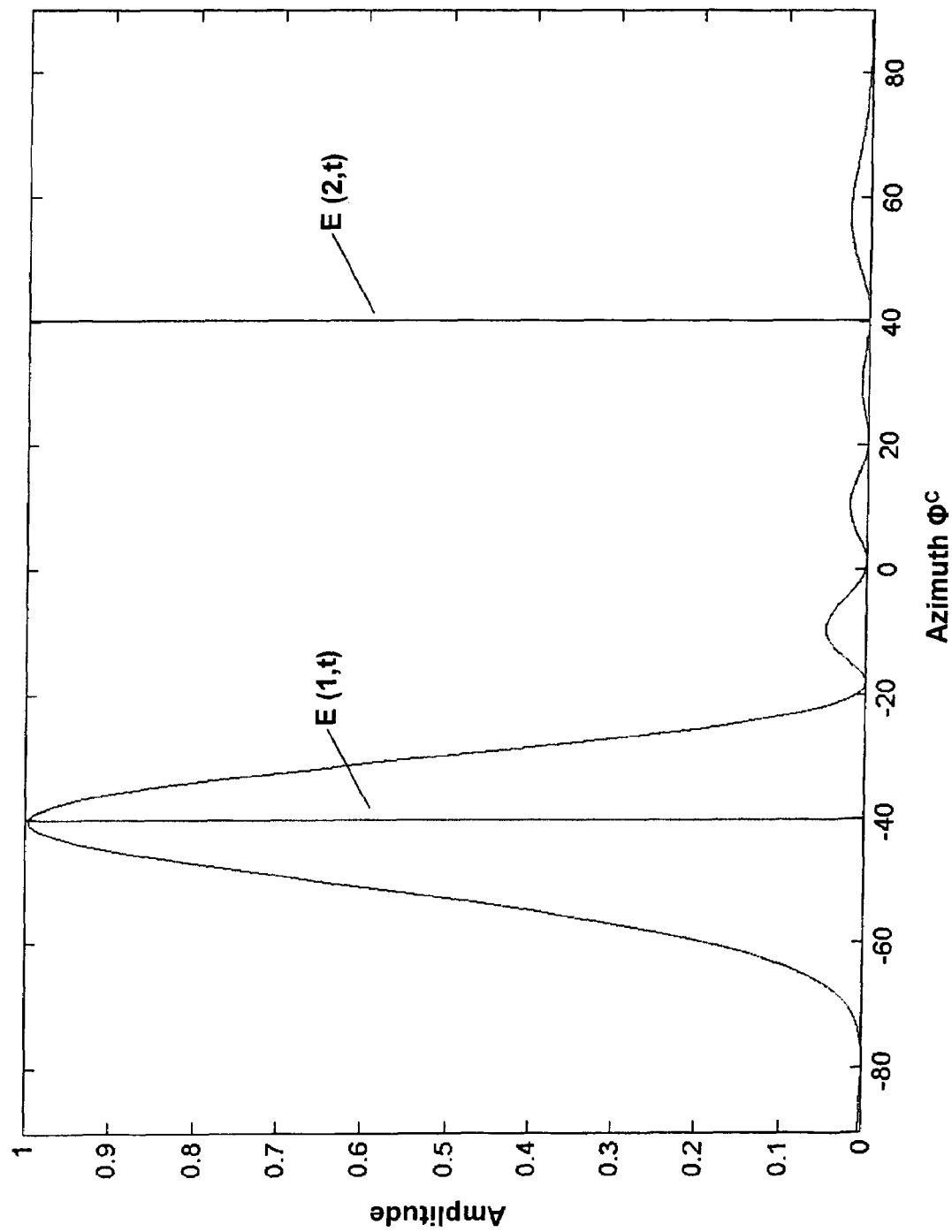
FIG. 9 shows how the constant modulus, transient signal is separated using the invention by placing a null to block the amplitude modulated signal while letting the constant modulus signal pass.

FIGS. 8-10 show signal waveforms when demonstrating the operation of the invention. More specifically, these figures show the two signals E(1,t) and E(2,t) of FIG. 7, how they interfere with each other and how they look after they are copied, captured, and the azimuth angle from which each of the two signals originates is determined in accordance with the teaching of the invention.

FIGS. 8A-8C show three time domain signal traces. FIG. 8A shows how the two incident signals E(1,t) and E(2,t) of FIG. 7 are received on antenna element 16-1 in FIG. 1, and signals E(1,t) and E(2,t) interfere and generate the composite voltage V(1,t) that includes noise η(1,t). The two signals are to be separated using the teaching of the present invention. FIG. 8B shows the constant amplitude, transient signal s(1,t) as it would be originally transmitted without noise. An optimum beam forming network 12 (beam former), for the numerically injected noise shown, will copy received signal E(1,t) with an SINR=18.9317 dB. The present invention can copy signal E(1,t) as shown in FIG. 8C from the combined interfering incident signals E(1,t) and E(2,t) plus η(1,t) at the nearly optimum level of SINR=18.9258 dB.

FIG. 9 shows how the clean copy of signal E(1,t) is obtained using the invention by placing a null at +40 degrees to block signal E(2,t), while letting signal E(1,t) pass at −40 degrees.

Figure 10A:
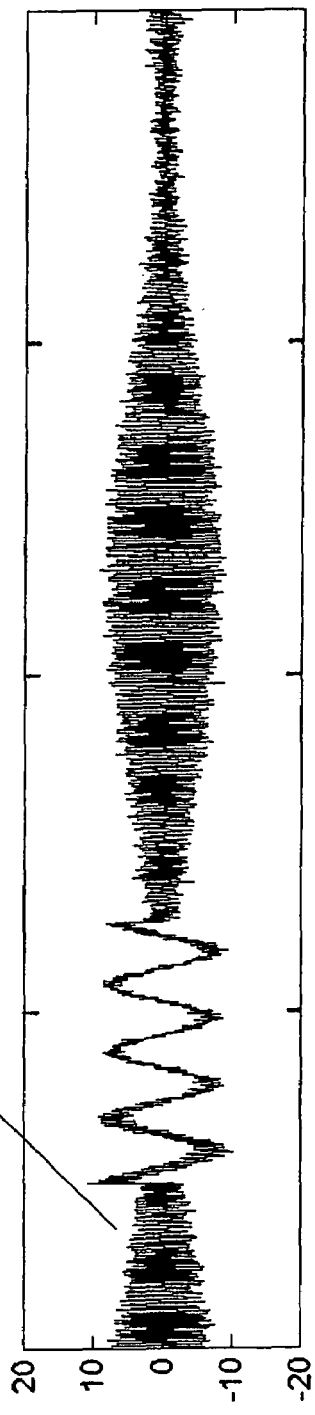
Figure 10B:
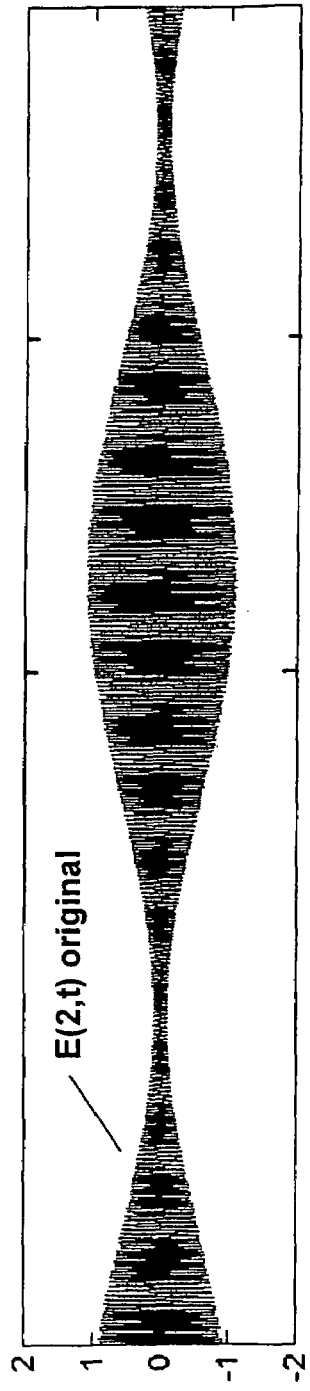
FIG. 10B shows the original amplitude, transient modulated signal of FIGS. 8A and 10A as it is transmitted.
Figure 10C:
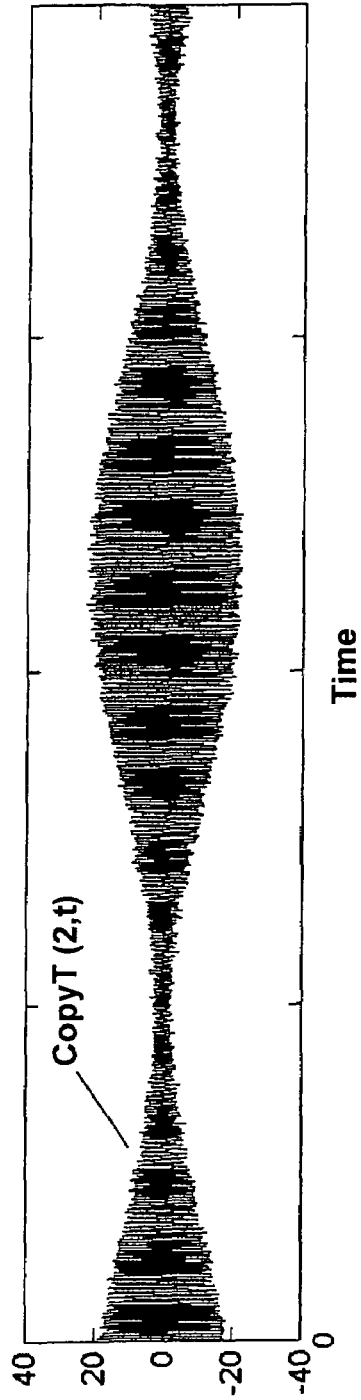
FIG. 10C shows the amplitude modulated signal after it has been captured and separated from the interfering signals shown in FIGS. 8A and 10A using the teaching of the present invention.

FIGS. 10A through 10C show three time domain signal traces. FIG. 10A is a repeat of FIG. 7A for visual reference purposes. FIG. 10B shows the non-constant modulus, amplitude modulated signal E(2,t) as it would originally be transmitted without noise. The clean copy of received signal V(2,t) shown in FIG. 10C is achieved by the teaching of the invention with the beam forming network 12 of FIG. 1 placing a null at −40 degrees to block signal E(1,t) and letting signal E(2,t) pass at +40 degrees.

Figure 11A:
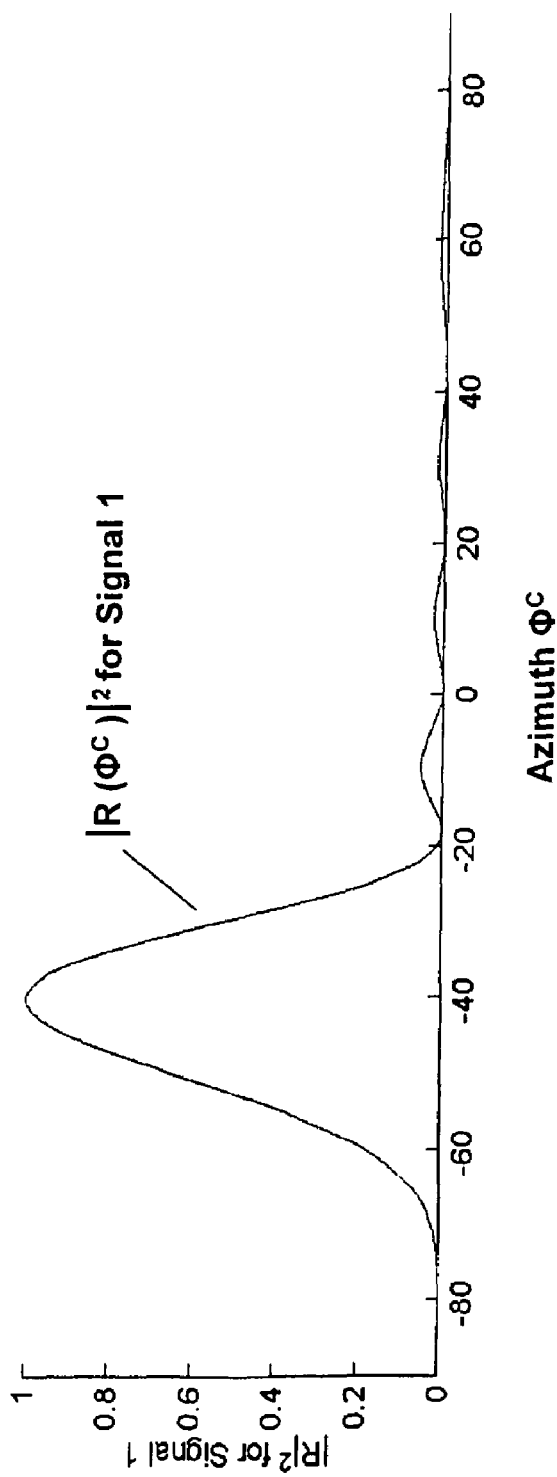
FIGS. 11A&B show correlation curves obtained using the teaching of the invention with peaks at the angle of arrival direction for the constant modulus, transient signal and the amplitude modulated signal to separate them.
Figure 11B:
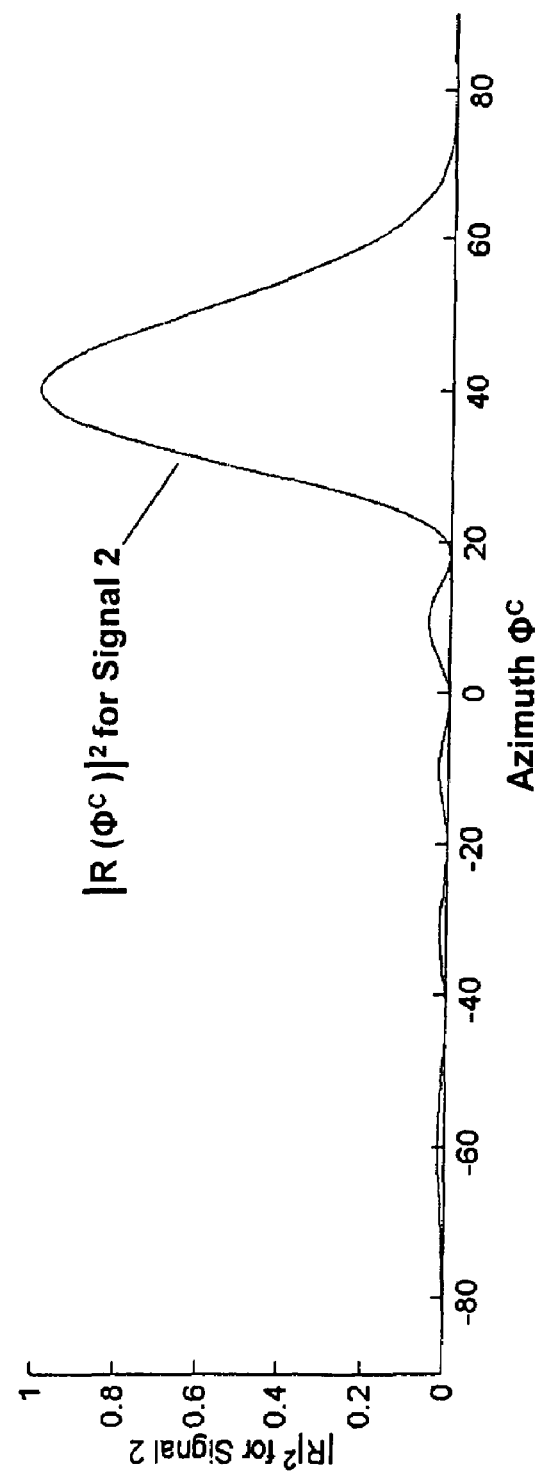

In FIGS. 11A and 11B the CIDF and Wiener-Hopf processing of FIG. 6 is used to compute direction finding (DF) wave arrival angles for the two signals E(1,t) and E(2,t) of FIG. 7 as shown in FIGS. 11A and 11B. A CIDF correlation curve shown in FIG. 11A peaks at the arrival direction of −40 degrees for the constant amplitude, transient signal E(1,t) shown in FIG. 7. A CIDF correlation curve shown in FIG. 11B peaks at the arrival direction of +40 degrees for the non-constant modulus, amplitude modulated signal E(2,t) shown in FIG. 7.

The two signal capture process described in FIGS. 7, 8 and 9 would not have required an array of eight dipole antennas as shown in FIG. 6. Theoretically only three antennas would have been sufficient. The extra antennas would however serve an additional function of increasing the copied signal signal-to-noise ratio (SNR). Eight antennas increase the SNR, relative to that received on a single antenna, by approximately nine dB. For example, the mathematical demonstration described above used noise injected at each antenna port at a 10 dB SNR level.

While what has been disclosed herein is the preferred embodiment of the invention, it will be understood by those skilled in the art that numerous changes may be made without departing from the spirit and scope of the invention.

What is claimed is:

1. A method for separating a plurality of co-channel, interfering signals of interest received by antennas of an antenna array without any a priori knowledge of the signals, the method comprising the steps of:
   (a) forming a matrix in eigenspace based on samples of the signals received by each of the antennas of the antenna array, the matrix yielding an eigenstream for each signal of interest;
   (b) processing the eigenstreams for each signal of interest from step (a) to determine eigenweights for each signal of interest;
   (c) processing each of the sets of eigenweights and their associated eigenstream determined in step (b) by performing on each eigenstream time domain processing followed by performing frequency domain processing to determine revised eigenweights for each signal of interest;
   (d) comparing the eigenweights determined in step (b) to the revised eigenweights determined in step (c) for each eigenstream to determine a difference between them;
   (e) repeating steps (b), (c) and (d) for the eigenstream for a signal of interest only if the eigenweight difference determined in step (d) for the last mentioned eigenstream exceeds a predetermined value, and using the revised eigenweights from step (c) as the preliminary eigenweights in step (b) when steps (b), (c) and (d) are repeated;
   (f) converting the revised eigenweights for each signal of interest from step (c) to beam forming weights for each of the signals of interest when it is determined in step (e) that the eigenweight difference does not exceed the predetermined value; and
   (g) processing a copy of the received signals using the beam forming weights produced in step (f) for each signal of interest to extract each signal of interest from the received, interfering signals.

2. The method in accordance with claim 1 wherein step (b) comprises the steps of:
   (h) determining the number of interfering signals of interest from the matrix; and
   (i) establishing preliminary eigenweights for each signal eigenstream.

3. The method in accordance with claim 2 further comprising the step of:

(j) orthogonalizing each of the processed eigenstreams after they have been processed in step (c).

4. The method in accordance with claim 3 wherein there is a beam forming network for each signal of interest to be separated from other interfering signals, each such network has a weighting circuit associated with each of the antennas of the array of antennas, the signals from each of the array of antennas are input to the associated one of weighting circuits in each of the networks, and wherein step (g) comprises the steps of:
(k) weighting the antenna signal input to each weighting circuit by the beam forming weights determined in step (f) for the signal of interest; and
(l) summing the weighted antenna signals output from the weighting circuits in each network to separate the signal of interest.

5. The method in accordance with claim 4 further comprising the step of:
(m) determining a direction from which each signal of interest is being received by the antennas of the antenna array using the beam forming weights determined in step (f).

6. The method in accordance with claim 5 wherein a correlation interferometer direction finding algorithm is used to determine the direction from which each signal of interest is being received.

7. The method in accordance with claim 1 wherein the frequency domain processing in step (c) utilizes fast Fourier transforms.

8. The method in accordance with claim 5 wherein either the time domain processing or the frequency domain processing performed in step (c) may be eliminated when there is a priori knowledge of a received signal being a constant modulus or non-constant modulus signal.

9. The method in accordance with claim 4 wherein step (a) comprises the steps of:
(m) forming a covariance matrix using samples of the signals received by each of the antennas of the antenna array; and
(n) transforming the covariance matrix into the matrix in eigenspace to produce an eigenstream for each received signal of interest.

10. The method in accordance with claim 9 wherein the covariance matrix created in step (m) is transformed in step (n) into a matrix in eigenspace to produce a time domain eigenstream for each received signal of interest, and each eigenstream is defined by a steered eigenvector that is equal in length to the covariance matrix integration period.

11. The method in accordance with claim 9 wherein step (n) is performed using a conventional Hermitian matrix decomposition technique.

12. The method in accordance with claim 2 wherein the beam forming weights determined in step (f) can be used for extended periods of time and only need to be updated on an intermittent basis.

13. The method in accordance with claim 1 wherein step (b) comprises the steps of:
(h) performing time domain processing on the eigenstreams; and
(i) performing frequency domain processing on the eigenstreams.

14. The method in accordance with claim 13 further comprising the step of:
(j) orthogonalizing each of the processed eigenstreams after they have been processed in steps (h) and (i).

15. The method in accordance with claim 14 wherein there is a beam forming network for each signal of interest to be separated from other interfering signals, each such network has a weighting circuit associated with each of the antennas of the array of antennas, the signals from each of the array of antennas are input to the associated one of weighting circuits in each of the networks, and wherein step (d) comprises the steps of:
(k) weighting the antenna signal input to each weighting circuit by the beam forming weights determined in step (f) for the signal of interest; and
(l) summing the weighted antenna signals output from the weighting circuits in each network to separate the signal of interest.

16. The method in accordance with claim 15 further comprising the step of:
(m) determining a direction from which each signal of interest is being received by the antennas of the antenna array using the beam forming weights determined in step (f).

17. The method in accordance with claim 13 wherein either step (h) or (i) may be eliminated when there is a priori knowledge of a received signal being a constant modulus or non-constant modulus signal.

18. The method in accordance with claim 4 wherein the beam forming weights determined in step (f) can be used for extended periods of time and only need to be updated on an intermittent basis.

19. The method in accordance with claim 16 wherein the beam forming weights determined in step (f) can be used for extended periods of time and only need to be updated on an intermittent basis.

20. The method in accordance with claim 1 wherein step (a) comprises the steps of:
(h) forming a covariance matrix using samples of the signals received by each of the antennas of the antenna array; and
(i) transforming the covariance matrix into the matrix in eigenspace to produce an eigenstream for each received signal of interest.

21. The method in accordance with claim 20 wherein step (i) performed using a conventional Hermitian matrix decomposition technique.

22. The method in accordance with claim 1 wherein there is a beam forming network for each signal of interest to be separated from other interfering signals, each such network has a weighting circuit associated with each of the antennas of the array of antennas, the signals from each of the array of antennas are input to the associated one of weighting circuits in each of the networks, and wherein step (g) comprises the steps of:
(h) weighting the antenna signal input to each weighting circuit by the beam forming weights determined in step (f) for the signal of interest; and
(i) summing the weighted antenna signals output from the weighting circuits in each network to separate the signal of interest.

23. The method in accordance with claim 22 further comprising the step of:
(j) determining a direction from which each signal of interest is being received by the antennas of the antenna array using the beam forming weights determined in step (f).

24. The method in accordance with claim 1 wherein the beam forming weights determined in step (f) can be used for extended periods of time and only need to be updated on an intermittent basis.

\* \* \* \* \*